United States Patent
Qi et al.

(10) Patent No.: US 10,395,647 B2
(45) Date of Patent: Aug. 27, 2019

(54) SYSTEM AND METHOD FOR NATURAL LANGUAGE PROCESSING

(71) Applicant: Harman International Industries, Incorporated, Stamford, CT (US)

(72) Inventors: Lianjun Qi, Shanghai (CN); Jianjun Ma, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/794,114

(22) Filed: Oct. 26, 2017

(65) Prior Publication Data

US 2019/0130895 A1    May 2, 2019

(51) Int. Cl.

| | |
|---|---|
| *G10L 15/06* | (2013.01) |
| *G10L 15/18* | (2013.01) |
| *G10L 15/00* | (2013.01) |
| *G10L 15/32* | (2013.01) |
| *G06F 17/27* | (2006.01) |
| *G10L 15/197* | (2013.01) |
| *G10L 15/22* | (2006.01) |
| *G10L 15/26* | (2006.01) |

(52) U.S. Cl.
CPC ........ *G10L 15/063* (2013.01); *G06F 17/2785* (2013.01); *G10L 15/00* (2013.01); *G10L 15/1815* (2013.01); *G10L 15/197* (2013.01); *G10L 15/22* (2013.01); *G10L 15/26* (2013.01); *G10L 15/32* (2013.01)

(58) Field of Classification Search
None
See application file for complete search history.

(56) References Cited

U.S. PATENT DOCUMENTS

| | | | |
|---|---|---|---|
| 8,650,031 B1 | 2/2014 | Mamou et al. | |
| 9,384,734 B1 * | 7/2016 | Wiseman | ................ G10L 15/26 |
| 2003/0083863 A1 * | 5/2003 | Ringger | ................ G06F 17/277 |
| | | | 704/10 |
| 2011/0153324 A1 * | 6/2011 | Ballinger | ................ G10L 15/30 |
| | | | 704/235 |
| 2012/0303561 A1 * | 11/2012 | Sathish | .............. G06Q 30/0282 |
| | | | 706/14 |
| 2014/0337032 A1 * | 11/2014 | Aleksic | ................... G10L 15/32 |
| | | | 704/257 |
| 2015/0279360 A1 | 10/2015 | Mengibar et al. | |
| 2015/0378671 A1 * | 12/2015 | Grobauer | ................ G06F 3/167 |
| | | | 704/275 |
| 2016/0379632 A1 * | 12/2016 | Hoffmeister | ............ G10L 15/18 |
| | | | 704/253 |
| 2017/0133010 A1 | 5/2017 | Printz | |
| 2017/0173262 A1 * | 6/2017 | Veltz | ................... A61M 5/1723 |

(Continued)

FOREIGN PATENT DOCUMENTS

WO    20170095476 A1    6/2017

*Primary Examiner* — Neeraj Sharma
(74) *Attorney, Agent, or Firm* — Angela M. Brunetti

(57) ABSTRACT

A system and method for improving accuracy of natural language processing using a plurality of speech recognition engines, a data fusion model to identify a correct result from the plurality of speech recognition engines and a semantic understanding model, separate and distinct from the speech recognition model, to process the correct results. A corpus is developed using the correct results and the corpus is used to train the data fusion model and the semantic understanding model.

6 Claims, 3 Drawing Sheets

(56) References Cited

U.S. PATENT DOCUMENTS

| | | | |
|---|---|---|---|
| 2017/0270919 A1* | 9/2017 | Parthasarathi | G10L 15/20 |
| 2018/0096678 A1* | 4/2018 | Zhou | G10L 15/32 |
| 2018/0197545 A1* | 7/2018 | Willett | G10L 15/30 |
| 2018/0218728 A1* | 8/2018 | Manuvinakurike | G10L 15/063 |
| 2019/0139540 A1* | 5/2019 | Kanda | G10L 15/14 |

* cited by examiner

SYSTEM AND METHOD FOR NATURAL LANGUAGE PROCESSING

TECHNICAL FIELD

The inventive subject matter is directed to natural language processing for automatic speech recognition and more particularly to improving the accuracy of natural language processing.

BACKGROUND

In a world where connectivity is becoming commonplace, there are a multitude of devices that integrate speech recognition technology to improve the human-machine interface that exists between a user and connected devices. For example, in a vehicle, a navigation system, an infotainment system, a climate control system, or other vehicle operations may all be controlled using speech recognition technology. In a connected home, household items such as televisions, clocks, appliances, light switches, thermostats and vacuum cleaners may integrate speech recognition technology. Other portable devices such a personal assistants, smart watches, tablets, mobile phones, to name just a few, also integrate speech recognition technology.

In current practices for devices, a single speech recognition engine is responsible for automatic speech recognition and semantic understanding functions. However, speech recognition engines are known to be less than completely accurate and frequently fail to recognize or identify errors in natural language processing.

There is a need to improve the accuracy of natural language processing used in speech recognition technology.

SUMMARY

A system and method for improving accuracy of natural language processing using a plurality of speech recognition engines, a data fusion model to identify a correct result from the plurality of speech recognition engines and a semantic understanding model, separate and distinct from the speech recognition model, to process the correct results. A corpus is developed using the correct results and the corpus is used to train the data fusion model and the semantic understanding model.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
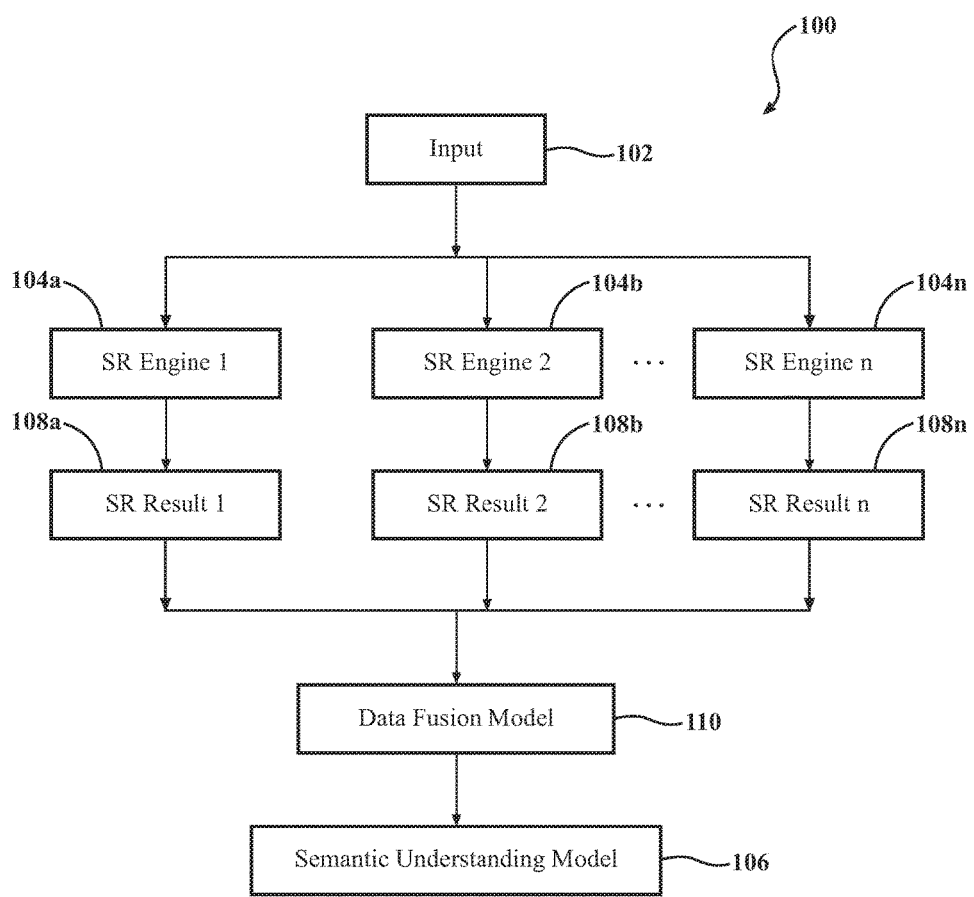
FIG. 1 is a block diagram of a system architecture for a system for natural language processing.

Traditionally a device uses only one speech recognition engine. That single engine is responsible for both automatic speech recognition functions and semantic understanding functions. FIG. 1 is a block diagram of a system 100 for natural language processing on a device, such as a portable or mobile phone or tablet, a computer, an infotainment system, or any other device that implements speech recognition technology. The system includes computer executable instructions that may be compiled or interpreted from computer programs created using a variety of programming languages and/or technologies. In general, a processor (such as a microprocessor) receives instructions, for example from a memory, a computer-readable medium or the like and executes the instructions. The processor includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. A communication means, such as a data bus, for communicating with the processor is also included.

An input device 102, such as a microphone, receives a natural language input, such as a verbal command from a user, and presents the verbal input command to a plurality of speech recognition engines 104a-n accessible by way of the processor. The speech recognition engines 104a-n are commercially available engines such as iFlyTek, Baidu, Hound, Siri, Amazon Alexa and Microsoft Cortana, to name just a few examples. Each speech recognition engine 104 in the plurality of speech recognition engines 104a-n is responsible for the automatic speech recognition portion of natural language processing only. The semantic understanding portion is accomplished separately in a semantic understanding model 106 to be discussed later herein.

Each speech recognition engine 104 in the plurality of speech recognition engines 104a-n provides a result 108, thereby producing a plurality of results 108a-n. For the verbal input command, it is possible that a different result will be produced among the speech recognition engines 104a-n. A data fusion model 110 incorporates the plurality of results 108a-n to select a correct result. A semantic understanding model 106 receives the correct result to be used by the device. The details of how each speech recognition engine 104 in the plurality of speech recognition engines will not be discussed herein. There are several approaches to how each speech recognition engine arrives at their corresponding result 108, the variety of which is inherently useful to the data fusion model 106 when selecting a correct result or when determining a correct result in the event there is no correct result from which to select.

Further, the system 100 may involve the processor digitally processing an audio signal received at the input 102 to enhance the input signal. For example, the verbal command received at the input 102 may be digitized and filtered to eliminate background noises.

Figure 2:
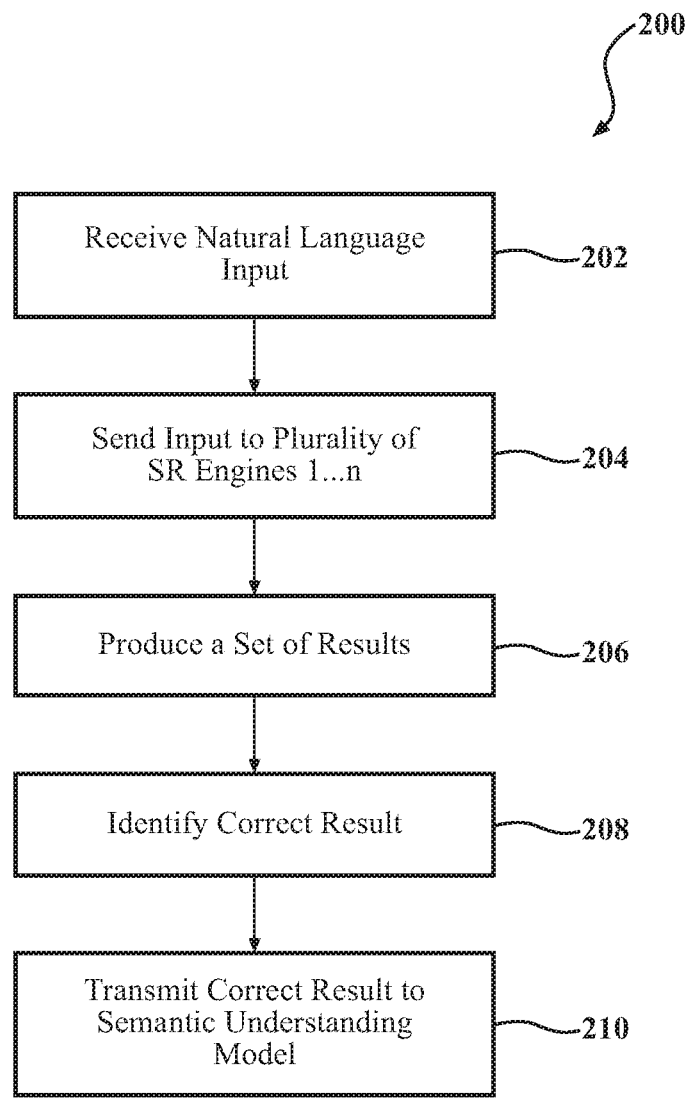
FIG. 2 is a flow chart of a method for natural language processing.

Referring to FIG. 2, a flow diagram of a method 200 is shown. A speech, or audio, input is received 202 at an input, such as a microphone, and sent 204 to a plurality of speech recognition engines. Each speech recognition engine produces a result that is received and compiled into a set of results 206 by a data fusion model. A correct result is identified 208, the correct result is transmitted 210 to a semantic understanding model for processing by the device. A correct result is easily identified when the results from each one of the speech recognition engines are the same. However, when the results are different, further development is needed in order to identify the correct result.

When the results from the plurality of speech recognition engines are not the same, which is likely to be the case in many scenarios, the determination of the correct result is accomplished by statistical language modeling. Statistical language modeling is used to calculate the probability of a sentence, or verbal command. There are many statistical language modeling methods available. One example is an N-gram model.

Figure 3:
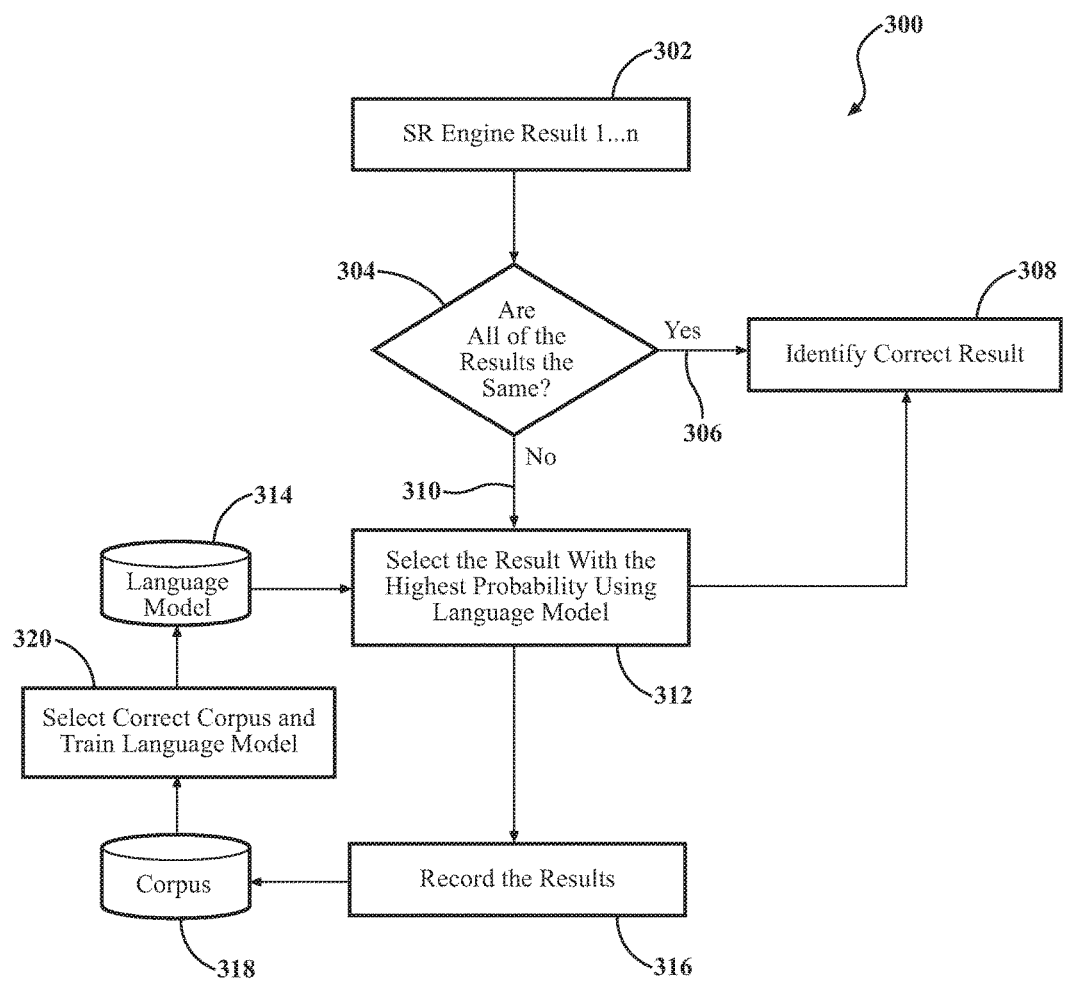
FIG. 3 is a flow chart of a method for determining a correct result.

Referring to FIG. 3, a more detailed flow diagram 300 is shown to describe the determination of a correct, or optimal, result and the training of the language model by way of developing a corpus using the correct results collected from the plurality of speech recognition engines. Each result from the plurality of speech recognition results is compiled 302 and compared 304 to each other. In the event all of the results are the same 306, a correct result is identified 308. In the event the results are not all the same 310, a result is selected 312 by applying the language model 314 and assigning a probability to each of the results. A result selected 312 based on its probability of being a correct result. The result selected 312 will have the highest probability, within the set of results, of being a correct result. The probability of the result is based on the sentence, or verbal command, in its current application, or context, as determined using the applied language model 314. The correct results are recorded 316 and incorporated into a corpus 318. A model, such as an N-gram model, is applied to select a correct corpus and used to train 320 the language model 314. For example, a Viterbi algorithm may be applied to select the result with the highest probability of being the correct result 312, and that selected result is identified as the correct result 312. In summary, data fusion that occurs in the data fusion model allows for selecting the correct result from multiple identified results or selecting an optimal result from combined results, which statistically produces a more accurate result.

As an example, a user inputs a verbal command "I want to go to Mike's house". Speech recognition engine 1 returns result 1, "I want to go to Mike's house". Speech recognition engine 2 returns result 2 "I want to go to Mike's horse". Speech recognition engine 3 returns result 3, "I won't to go to Mike's house". Clearly, result 1 represents a normal expression and will have a higher joint probability that this is a correct result. In another example, a user inputs a verbal command, "Start Music". Speech recognition engine 1 returns result 1 "Music start", speech recognition engine 2 returns result 2 "Music star". This example is more complicated because both statements may be normal expressions. However, taking into consideration a vehicle environment for the device being "talked" to, "Music start" is more likely and therefore will result in a greater joint probability of being identified as a correct result.

Through the speech recognition model, speech is recognized as text. Through the data fusion model, the correct result is identified. Through the semantic understanding model, data is structured so that the correct, or optimal, result is presented in a logical manner. Integrating the results of multiple speech recognition engines increases the probability of a correct result being identified. Similarly, the improvement in accuracy will apply to the semantic understanding model. As an example, an input sentence "I need to go to the store" is processed by the speech recognition model and the correct result is identified to be "I need to go to the store. The semantic understanding model will identify an action in "navigation" with a destination to be "the store". As discussed above, there are many techniques that may be applied to this model, and using text classification to identify an action, i.e., navigation, and then using an information extraction method to identify corresponding parameters, i.e., the store destination. Support vector machines (SVM) may be used to implement text categorization and conditional random fields (CRM) may be used to implement information extraction.

Because a sentence input is sent to a plurality of speech recognition engines, the results of multiple speech recognition engines are compiled. Therefore, the accuracy of the system 100 and method 200, 300 is improved by collecting more corpora used in training the semantic understanding model, also known as the language model 314.

The data fusion model 110 and the semantic understanding model 106 are continually being improved by obtaining correct speech recognition results. The more corpora for the data fusion model means better training, and therefore an increased probability of identifying a correct result. Likewise, for the semantic understanding model, more corpora means better training and an increase in the probability of recognizing a correct result. Corpora is collected by recording all the results of the speech recognition engines. The corpus is arranged by selecting input sentences with low joint probability. It may be necessary to manually determine if an input sentence is a normal expression. Upon such determination, the input sentence is added to the corpora. When the corpora reaches a predetermined size, the models may be retrained. The retrained models are then applied as an update to a system that is being used on, or by, a device.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A system for improving accuracy of natural language processing, the system comprising:
   a natural language input device;
   a plurality of speech recognition engines for automatic speech recognition functions only, the plurality of speech recognition engines being connected to the input device, the plurality of speech recognition engines receive an input from the input device and presents a speech recognition result as part of a set of speech recognition results;
   a data fusion model to receive the set of speech recognition results and to identify a correct result from the set of speech recognition results, the correct result being identified as a result in the set of speech recognition results that has the highest probability of being a correct result from the plurality of speech recognition engines;
   the data fusion model to receive all of the speech recognition results and to determine a correct result from speech recognition results, the determined correct result being selected from a result in the set of speech recognition results that has a low probability of being a correct result and is manually determined to be a normal expression of the input from the input device;
   a semantic understanding model, separate and distinct from the plurality of speech recognition engines, to process the identified correct result and the determined correct result;
   a corpora created from the processed correct result;
   a corpus arranged from a plurality of the corpora; and
   the data fusion model being updated by the corpus.

2. The system as claimed in claim 1 wherein the data fusion model to identify a correct result from the set of speech recognition results further comprises the correct result being identified as each of the results in the set of speech recognition results being the same.

3. A method for natural language processing in a system having a natural language input device, a plurality of speech recognition engines, a data fusion model and a semantic understanding model, the method carried out in a processor having computer executable instructions for performing the steps of:
   receiving, at the natural language input device, an input sentence;
   processing the input sentence at the plurality of speech recognition engines, each of the plurality of speech recognition engines producing a result that is part of a set of results for all of the speech recognition engines;
   recording all of the results from the plurality of speech recognition engines to develop a corpora;
   applying the data fusion model to identify a correct result from the set of results, the correct result being identified as a result in the set of speech recognition results that has the highest probability of being a correct result;
   applying the data fusion model to determine a correct result from all of the results, the correct result being determined from one or more results from the set of results for the input sentence that has a low probability of being a correct result, determining manually that the input sentence is a normal expression, and adding the input sentence to the developed corpora;
   processing the identified correct result and the determined correct result in the semantic understanding model;
   collecting the processed correct results in a corpus; and
   updating the data fusion model using the corpus.

4. The method as claimed in claim 3 wherein the step of applying the data fusion model to identify a correct result further comprises the correct result being identified by each of the results in the set of speech recognition results being the same.

5. A non-transitory computer readable storage medium comprising a program, which, when executed by one or more processors, performs an operation comprising:
   processing an input sentence received by an input device using a plurality of speech recognition engines;
   recording all of the results from the plurality of speech recognition engines to develop a corpora;
   producing a set of results that includes all results for each speech recognition engine in the plurality of speech recognition engines;
   applying a data fusion model to the set of results to identify a correct result from the set of results;
   applying the data fusion model to all of the results to determine a correct results from all of the results;
   processing the identified correct result in the semantic understanding model, the identified correct result being identified as a result in the set of speech recognition results that has the highest probability of being a correct result;
   processing the determined correct result in the semantic understanding model, the determined correct result being determined from a result in the set of speech recognition results that has a low probability of being a correct result, determining manually that the input sentence is a normal expression, and adding the input sentence to the developed corpora; and
   updating the data fusion model using the processed correct results.

6. The computer readable medium as claimed in claim 5 wherein the program performs an operation of applying a data fusion model to the set of results to identify a correct result from the set of results further comprises the correct result being identified when all of the results in the set of results are the same.

* * * * *